United States Patent [19]

Zahid

[11] 4,182,377

[45] Jan. 8, 1980

[54] LOW COST ACCUMULATOR DEVICE

[75] Inventor: Abduz Zahid, Los Angeles, Calif.

[73] Assignee: Greer Hydraulics, Inc., Chatsworth, Calif.

[21] Appl. No.: 966,019

[22] Filed: Dec. 4, 1978

[51] Int. Cl.[2] .......... F16L 55/04

[52] U.S. Cl. .......... 138/30

[58] Field of Search .......... 138/20, 30, 31; 220/85 B

[56] References Cited

U.S. PATENT DOCUMENTS

| | | | |
|---|---|---|---|
| 2,399,444 | 4/1946 | Mercier | 138/30 |
| 2,936,787 | 5/1960 | Mercier | 138/30 |
| 3,433,268 | 3/1969 | Greer | 138/30 |
| 3,511,280 | 5/1970 | Mercier | 138/30 |
| 3,963,053 | 6/1976 | Mercier | 138/30 |
| 4,056,127 | 11/1977 | Greer | 138/30 |

FOREIGN PATENT DOCUMENTS

| | | | |
|---|---|---|---|
| 2509200 | 10/1975 | Fed. Rep. of Germany | 138/30 |

*Primary Examiner*—Harry N. Haroian
*Assistant Examiner*—James E. Bryant, III
*Attorney, Agent, or Firm*—Arthur B. Colvin

[57] ABSTRACT

This invention relates to a low cost accumulator device, and more particularly to an accumulator wherein, at least in the oil port adjacent portions, the pressure vessel is formed by a spinning operation effected on a tubular blank. The device is characterized by a buffer member disposed adjacent the oil port and positioned to be deflected by the bladder in such manner as to protect the bladder from extrusion through the irregularities inherently formed as a result of the spinning operation.

4 Claims, 3 Drawing Figures

LOW COST ACCUMULATOR DEVICE

BACKGROUND OF THE INVENTION

1. Field of the Invention

This invention is in the field of accumulator or pulsation dampener devices, and more particularly pertains to an accumulator or like device of the type in which a distensible bladder member is mounted within a pressure vessel, the bladder member dividing the vessel into two chambers communicated, respectively, with a gas charging port and with an oil port.

2. The Prior Art

Accumulator devices have found widespread application as means for storing energy and for dampening pulsations in liquid moving in a conduit. Such pressure devices conventionally include a rigid vessel of sufficient strength to withstand the high pressure to which the same will be exposed in use. The vessel, which is conventionally cylindrical or parti-spherical in shape, includes at one end a gas charging port and at the other an oil port which, in use, is connected to a source of fluid under pressure. A bladder member is disposed within the pressure vessel, the bladder member dividing the interior of the vessel into two chambers of variable size communicating, respectively, with the gas charging port on the one hand and the oil port on the other.

Gas under pressure is introduced through the gas charging port into one said chamber, whereupon the bladder, which typically carries a valve member, is distended in such manner that the valve member engages a complementally formed valve seat to close the oil port.

When pressures in the liquid conduit line to which the oil port is connected exceed the pressures in the chamber connected with the gas charging port, oil enters through the port, driving the bladder away from the seated position above referred to, and compressing the gas within the chamber, whereby pulsations in the oil line are damped and/or energy is stored in the compressed gaseous medium.

As is well known, the pressures within the gas chamber are often extremely high and, thus, when the oil pressure is reduced, the bladder is forced toward the oil port end of the accumulator device with tremendous force. In the event that there are any voids, ridges or irregularities within the pressure vessel in the areas extending from the vessel to the oil port, the pressure differential may be sufficient to extrude the bladder portions surrounding the valve seat through such crevices and into the oil port, resulting in rupture of the bladder or at least in premature wear and degradation thereof.

In view of the necessity for eliminating irregularities in the areas leading to the oil port, it has heretofore been the practice, in the formation of pressure vessels, to fabricate the same through extensive machining operations. Thus, the pressure vessel often will be comprised of two half sections which have been cast or forged, the open half sections providing ready access to the interior of the sections which will form the oil port, to enable facile machining thereof. The halves, after mounting of the bladder assembly, must then be welded together.

It will be readily recognized that forging separate half sections and thereafter machining and welding, coupled with the extreme care which must be taken in the course of the welding operation to prevent damage to the bladder, greatly increased the over-all cost of the accumulator device, with the result that it is often necessary to forego the use of accumulators in many applications in which they would otherwise be desirable.

While it is known that an enclosure having sufficient structural strength to resist the pressures encountered in the course of accumulator operations can be formed by a spinning operation wherein a tubular member is rotated relatively to a forming tool which is progressively urged against the surface of the tube to deform the same to a desired configuration, it is likewise recognized that the configuration resulting from the spinning operation, particularly at the inside of the curve formed in the course of spinning, exhibits irregularities of the type which would be likely to lead, as hereinabove noted, to bladder failure.

Accordingly, despite the economic desirability of spinning as opposed to forging and machining, prior vessels for accumulators have not heretofore been successfully fabricated on a large scale basis utilizing spinning operations without further machining in the critical area adjacent the oil port.

It is known, as indicated by Patents such as U.S. Pat. Nos. 2,399,444, 3,794,078 and 3,960,178 to provide an oil port having a valve seat which is itself formed of rubber and contacts directly a valve carried by the bladder. However, such devices do not contemplate a rigid and hence more wear resistant valve seat in combination with a surrounding buffer member which may also be deflected by the bladder into sealing relation of the area external of the port, in accordance with the present invention.

SUMMARY OF THE INVENTION

The present invention may be summarized as directed to an accumulator device, improved in that it is susceptible of being manufactured at substantially lower cost than accumulators heretofore known.

Briefly, the device of the invention, which is preferably fabricated from an integral tubular blank, is formed by spinning in such manner that one of the ends of the tubular blank section is inturned and drilled to define a mounting aperture for a gas charging valve. The opposite end of the tube is formed by spinning to define an oil port, and a cylindrical portion therebeneath, a transition portion being defined in the area between the full diameter of the vessel and the constricted portion adjacent the oil port.

The interior of the pressure vessel adjacent the oil port will be recognized, as a result of the spinning operation, to incorporate irregularities and/or crevices which, when the bladder member is in its distended position, could result in extrusion of bladder portions through the irregularities into the oil port area.

In accordance with the present invention there is provided at the junction of the transistion area and the oil port, a metal washer member defining a valve seat for the valve carried by the bladder, such washer carrying on its uppermost surface an annular elastomeric buffer member having an upper surface extending above the wall surface of the interior of the pressure vessel at the junction of the transition portion and the periphery of the washer defining the oil port, the elastomeric buffer preferably also extending radially laterally a small distance to cover the noted junction.

In accordance with the device as described, when the bladder is distended, the upwardly directed portion of the buffer will be caused by the bladder to be deflected downwardly and outwardly, covering the interface defining the lowermost terminal end of the transition portion, whereby any existing irregularities or crevices will be filled by the buffer under pessure of the bladder, preventing extrusion of the bladder or localized thinning and premature wear thereof.

It is accordingly an object of the invention to provide an accumulator device susceptible of low cost manufacture by virtue of the fact that the same may be formed by spinning operations, the device being provided with means adjacent the oil port which compensate for the irregularities inhering in spinning operations, thus preventing damage of the bladder.

A further object of the invention is the provision of a device of the type described which includes at the oil port end thereof, a valve seat assembly comprised of a metal washer having preferably bonded to the upper surface thereof an elastomeric buffer, the radial outermost periphery of which buffer extends above the internal wall portions of the pressure device at the junction between the side walls of the device and the boundary on which is seated the periphery of the washer defining the oil port and preferably, in addition extends radially over said junction to compensate for irregularities such as may exist as a result of spinning.

To attain these objects and such further objects as may appear herein or be hereinafter pointed out, reference is made to the accompanying drawings, forming a part hereof, in which.

Figure 1:
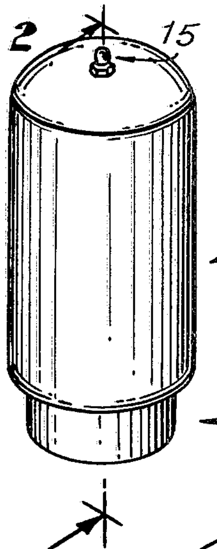
FIG. 1 is a perspective view of an accumulator device of the type described.

Turning now to the drawings, there is shown a pressure accumulator 10 which may be generally cylindrical throughout the major body portion 11 thereof, the accumulator, at its upper end 12, including an inwardly directed, parti-spherical wall 13. The wall portion 13 may be defined by a spinning or like operation, the wall being provided with a central through-going aperture 14 which mounts an essentially conventional gas charging assembly 15, as by a nut member 16 engaging the threaded shank 17 of a gas charging valve 18.

The bladder 21, which is of deformable resilient material such as rubber or similar material having like characteristics, together with the method of supporting the same, is essentially conventional, as is the provision of a valve member or button 23 disposed at the bottom 24 of the bladder. The button or valve member 23 is formed of a harder and, hence, more wear resistant material than the resilient elastomeric material of which the bladder is formed.

The lower end 25 of the pressure vessel, which is likewise formed as by spinning, includes a transition area 26 wherein the walls of the vessel progressively converge from the full tubular dimension of the side walls 11 to a narrower cylindrical conformation 27.

Figure 2:
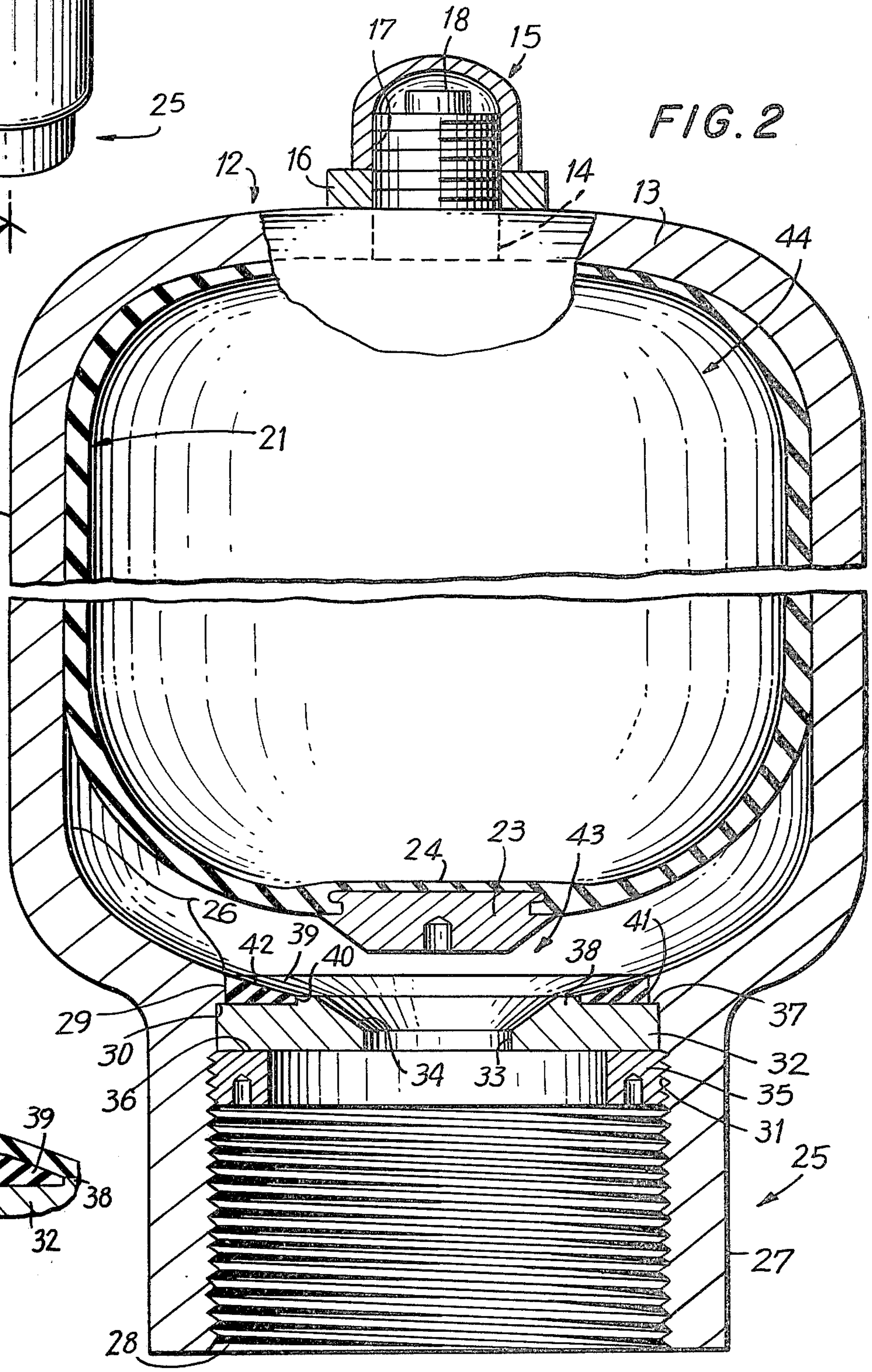
FIG. 2 is a magnified vertical sectional view of the device in accordance with the invention.

It will be appreciated that when the lowermost portion of the vessel are spun to the configuration of FIG. 2, there is defined an open mouth portion 28 at the lower end of the cylindrical portion 27, through which open mouth portion minimal interior machining operations may be readily performed. Such machining operations include the formation of an annular bore 29, and an outwardly directed stop shoulder 30. Additionally, operating through the open mouth portion, the interior walls of the cylindrical portion 27 may be formed with a thread 31.

A metallic washer 32 is provided with an interior bore 33 defining an oil port. The bore 33 preferably includes an upwardly directed bevel portion 34 defining a valve seat.

The washer assembly 32 is mounted through the use of a spanner nut 35 threaded into the thread 31 and bears against the under surface 36 of the washer assembly. An annular area 37 of the washer adjacent the periphery bears against the downwardly directed shoulder 30 previously described, whereupon the washer is clampingly supported in position at the lower end of the pressure vessel or casing.

The upper surface of the washer assembly 32 preferably includes an upstanding annular ridge 38. Bonded to the upper surface of the washer is an elastomeric buffer member 39, the inner periphery 40 of which engages against the outer periphery of the annular ridge.

The outer peripheral portion 41 of the buffer member 39 is of a height such as to extend above the level of the transistion portion 26 at the point where the lowermost end of the transistion portion merges with the vertically directed bore 29.

The upper surface of the buffer 39 is inclined as at the portion 42 whereby the outer peripheral portion 41 of the buffer is thicker, and at a higher level than the inner peripheral portion thereof.

The buffer is formed of a resilient elastomeric material which preferably is equal to or somewhat softer in durometer than the durometer of the bladder. Additionally, the overall diameter of the exterior of the buffer is preferably slightly greater than the diameter of the bore portion 29 such that when the washer is inserted into the position shown in FIG. 2, elements or increments of the buffer will extend radially outwardly and overlap the bore portion 29. Optionally, the overlap may be provided by a small, outwardly extending lip formed at the extremity of the buffer.

The operation of the device is essentially conventional for accumulators of the type described.

When the pressure in the oil chamber 43 exceeds the pressure in the gas chamber 44, the button or valve 23 will be spaced from the valve seat 34. When the pressure in the oil chamber is reduced, the greater pressure in the gas chamber 44 forces the valve 23 downwardly into seated engagement with the seat 34, sealing the oil port.

Figure 3:
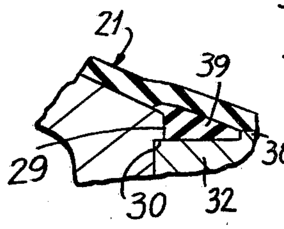
FIG. 3 is a fragmentary view of a portion of the device of FIG. 2, showing the position of the parts in the distended condition of the bladder.

In such condition, the outwardly distended bladder member will engage against and deflect the portion of the buffer 39 which extends above the level of the transition portion 26 into tight engagement against the corner or junction defined between said transition portion and the bore 29 (see FIG. 3).

It will thus be observed that the buffer will fill any irregularities formed as a result of spinning, precluding extrusion of the bladder material through such irregularities into areas of lower pressure. The irregularities typically take the form of channels or crevices which extend in the direction of the longitudinal axis of the pressure vessel, being the result of a gathering or concentration of the metal in the course of the inward spinning step.

Whereas heretofore pressure vessels required careful machining, particularly in the noted area, to eliminate such irregularities, the use of the buffer assembly as hereinabove described enable compensating for such irregularities, with resultant elimination of complex machining steps, and particularly machining steps on portions within the interior of the pressure vessel.

While the embodiment of accumulator herein illustrated by way of example has employed a valve seat on the pressure vessel and a valve carried by the bladder, it will be readily recognized that the improvements hereof may be equally employed in conjunction with a poppet type valve design or with an accumulator of the flow through type. Accrodingly, the invention is to be broadly construed within to scope of the appended claims.

Having thus described the invention and illustrated its use, what is claimed as new and is desired to be secured by Letters Patent is:

1. An accumulator device comprising a pressure vessel, said vessel being formed from an initially tubular blank to provide a body portion having a first end defining a gas charging port, the opposite end of said tubular blank being formed by spinning to define a generally cylindrical neck portion at its lowermost extremity merging with the interior wall of said body portion at an inwardly tapered transition portion thereof, said transition portion being generally frusto-conical, the interior of said neck portion being threaded and being formed at the end nearest said frusto-conical portion with an annular shoulder faced away from said transition portion, an annular metallic washer member mounted in said neck and having an upper surface seated against said shoulder, an annular clamp nut threaded into said neck and bearing against the lower surface of said washer clampingly to support said washer between said shoulder and said nut, said washer including an upwardly facing tapered valve seat defining an oil port, a compliant elastomeric annular buffer member mounted on the upper surface of said washer surrounding said valve seat, said buffer member including an inner peripheral portion merging with the upper surface of said washer and an outer peripheral portion intimately engaging the inwardly directed wall of said pressure vessel in the area between said shoulder and said transition portion, said buffer member at its outer peripheral portion including an annular, upwardly directed deflector lip extending into the body of said vessel to a height above the lower terminal end of said transition portion, and a bladder member formed of resilient elastomeric material, said bladder member dividing said vessel into two chambers connected, respectively, with said gas charging port and said oil port, said bladder member including a valve portion aligned with said valve seat, said lip portion of said buffer member being deflected outwardly to cover the junction of said outer periphery of said buffer member and said vessel responsive to expansion of said bladder, thereby to prevent extrusion of said bladder into said junction.

2. An accumulator device in accordance with claim 1 wherein said buffer member is bonded to said upper surface of said washer.

3. An accumulator device in accordance with claim 2 wherein said washer includes a centrally located, upwardly directed annular shoulder and said buffer member is disposed in the area between said shoulder and the periphery of said washer.

4. An accumulator device in accordance with claim 1 wherein said lip extends radially outwardly over said junction.

* * * * *